United States Patent [19]

Marume et al.

[11] Patent Number: 4,857,248

[45] Date of Patent: Aug. 15, 1989

[54] METHOD OF MANUFACTURING COSMETIC PUFF AND MANUFACTURING FRAMEWORK FOR USE IN THE METHOD

[75] Inventors: Yoshihiro Marume; Tadao Iwamoto, both of Hiroshima, Japan

[73] Assignee: Nishikawa Rubber Co., Ltd., Hiroshima, Japan

[21] Appl. No.: 129,556

[22] Filed: Dec. 7, 1987

[30] Foreign Application Priority Data

Feb. 14, 1987 [JP] Japan .................................. 62-31897

[51] Int. Cl.$^4$ .......................... C08J 9/30; B29C 67/20; B29C 39/12; B29C 41/22

[52] U.S. Cl. .................................... 264/46.4; 249/160; 264/46.5; 264/46.6; 264/50; 264/153; 264/255; 264/261; 264/292.4; 264/297.8

[58] Field of Search ...................... 264/46.4, 255, 261, 264/297.1, 297.4, 297.8, 51, 48, 54, 321, 153, 46.5, 46.6, 50

[56] References Cited

U.S. PATENT DOCUMENTS

| | | | |
|---|---|---|---|
| 2,001,305 | 5/1935 | Gorham et al. | 264/297.4 X |
| 2,190,376 | 2/1940 | Daley | 264/51 X |
| 2,290,622 | 7/1942 | Carter | 264/54 X |
| 2,347,600 | 4/1944 | Goode | 264/297.4 X |
| 2,394,327 | 2/1946 | Niessen et al. | 264/46.6 |

FOREIGN PATENT DOCUMENTS

| | | |
|---|---|---|
| 47-24779 | 8/1972 | Japan . |
| 54-24475 | 2/1979 | Japan . |
| 62-39811 | 10/1987 | Japan . |

Primary Examiner—Philip Anderson
Attorney, Agent, or Firm—Armstrong, Nikaido, Marmelstein, Kubovcik & Murray

[57] ABSTRACT

A method of manufacturing a cosmetic puff for liquid foundation includes forming a latex film coating on one side of a crimp pattern plate by applying a latex film compound thereon. The latex film coated plates are set in a manufacturing framework. The foamed latex foam compound is injected into the manufacturing framework while adding a coagulant and an activator therein to hereby produce a gelled latex foam covered with latex films on both sides. The latex foam and the latex films are simultaneously vulcanized to thereby bond the latex films onto the latex foam. A manufacturing framework for a cosmetic puff is also disclosed.

3 Claims, 3 Drawing Sheets

FIG. 1
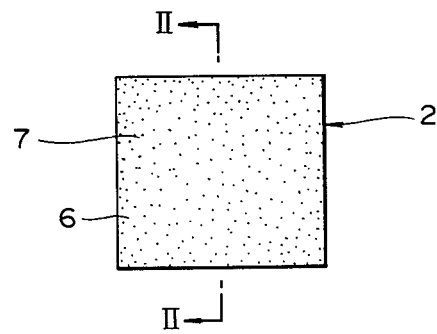
FIG. 2A  FIG. 2B  FIG. 2C
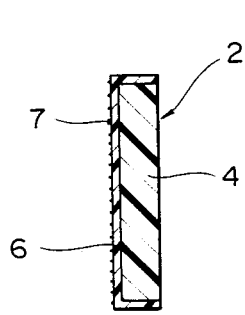 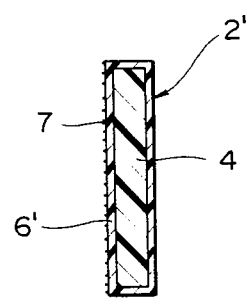 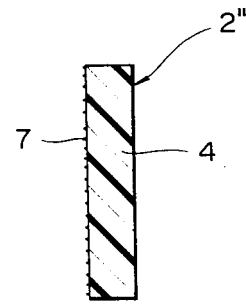

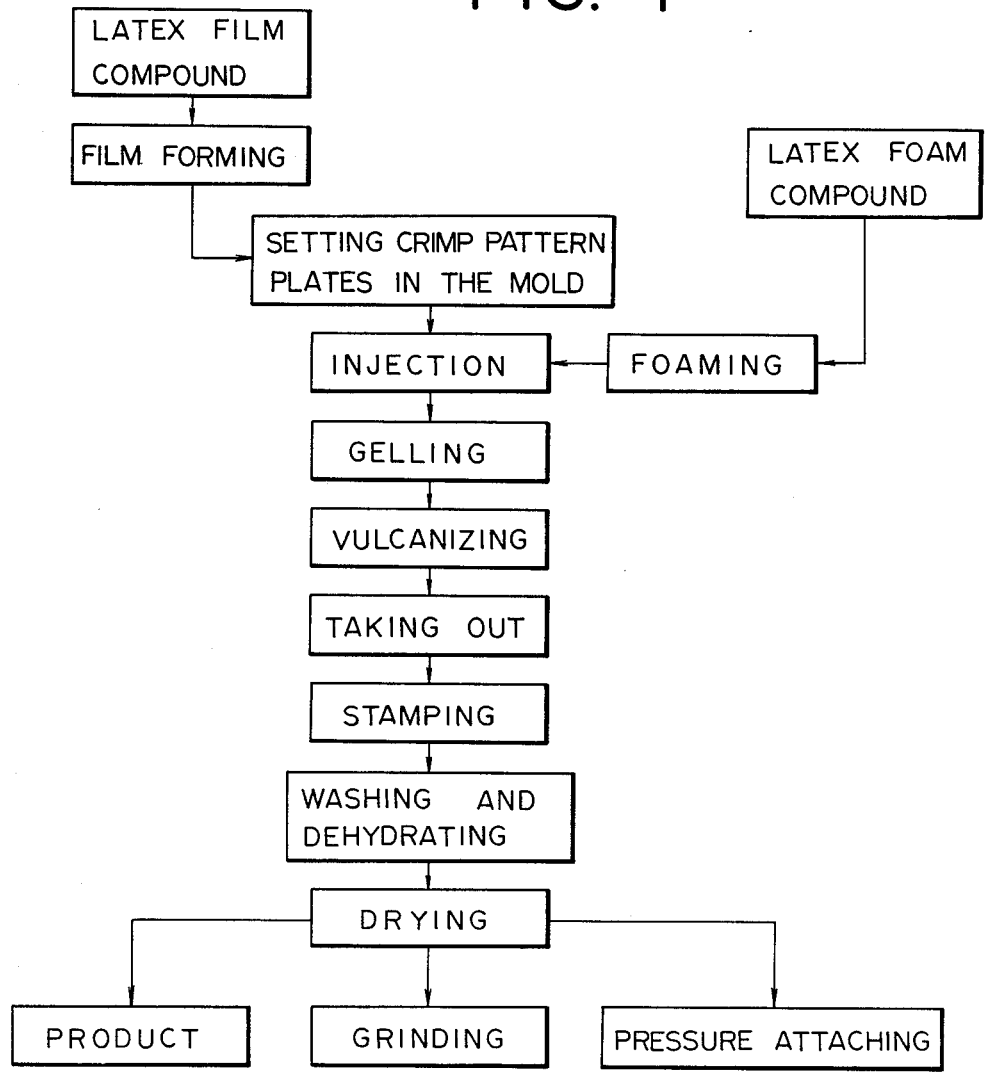

METHOD OF MANUFACTURING COSMETIC PUFF AND MANUFACTURING FRAMEWORK FOR USE IN THE METHOD

BACKGROUND OF THE INVENTION

This invention relates to a method of manufacturing a cosmetic puff for applying liquid foundation and a manufacturing framemwork for use in the method.

A typical conventional cosmetic puff for applying a powder or liquid foundation to a human face comprises a latex foam of a continuous cell structure per se without having any coating layer thereon or a latex foam covered with a cloth or the like. The puff made of latex foam is manufactured by the following process. First, a latex foam compound having a preselected ingredients is prepared and then the latex foam compound is poured into a shallow sheet mold or long cylindrical mold after foaming the latex foam compound by a foaming device. The process further includes subjecting the foamed latex foam compound poured into the mold to gelling and vulcanizing treatment for shaping, taking thus manufactured puff member out of the mold, cutting or stamping out the same for making a product of a generally final configuration, and washing, dehydrating, drying and grinding the same.

This puff forms a latex foam of a continuous cell structure from the outer surface to the interior thereof which exhibits a delicate texture, such as a favorable flexibility, soft feeling, good skin touch, etc. It is also exhibits a favorable cosmetic application property.

However, a puff produced by the above-mentioned conventional method, is intended for use of a powder foundation. Therefore, if it should be used for a liquid foundation, it would render the following inconveniences. Namely, since a liquid foundation is low in viscosity, such a continuous cell structure as mentioned absorbs a large amount of the liquid foundation into the interior of the puff and permits only a small amount of the liquid foundation to be left on the outer surface thereof. Thus, the liquid foundation is wastefully consumed. Moreover, the liquid foundation absorbed into the interior of the puff cannot be easily removed by water washing, cleaning, etc. In addition, liquid foundation which has remained there for a long time is tended to become rotten or get moldy, and thus the puff is unsanitary.

SUMMARY OF THE INVENTION

It is therefore an object of the present invention to provide a method of manufacturing a cosmetic puff for a liquid foundation which feels soft to ouch and which effectively prevents the liquid foundation from being absorbed therein.

Another object of the present invention is to provide a manufacturing framework for a cosmetic puff which is adapted to manufacture flat cosmetic puff members efficiently, each puff member having latex films formed thereon.

In accordance with an aspect of the present invention, there is provided a method of manufacturing a cosmetic puff for a liquid foundation comprising the steps of: preparing a latex foam compound having preselected ingredients; preparing a latex film compound having preselected ingredients; forming a latex film coating on one side of a crimp pattern plate by applying the latex film compound thereon; setting the latex film coated plates in a manufacturing framework; foaming the latex foam compound; injecting the foamed latex foam compound into the manufacturing framework while adding a coagulant and an activator therein to thereby produce a gelled latex foam covered with latex films on both surfaces; and vulcanizing the latex foam and the latex films simultaneously to thereby bond the latex films onto the latex foam.

The method further includes separating the vulcanized latex foam covered with the latex films on both sides from the crimp pattern plates by disassembling the manufacturing framework, and stamping out the latex foam covered with latex films to produce a desired shape of the puff.

In accordance with another aspect of the present invention, there is provided a manufacturing framework for a cosmetic puff comprising: a botom plate; a pair of side plates pivotally mounted to the bottom plate, each having a plurality of vertical grooves formed on the inside surface thereof when viewed in its erected state, and; a plurality of crimp pattern plates arranged in a vertically parallel relation with one another on the bottom plate with both side ends of each plate being received in the vertical grooves of the side plates. Each pair of the crimp pattern plates is spaced at a distance equal to the thickness of the puff to be manufactured with crimp pattern formed surfaces facing with each other.

A cosmetic puff manufactured by the method of the present invention is superior to a cosmetic puff which has been manufactured by the conventional method in the following ways:

(a) Since a latex foam of a continuous foam structure is used as a core member and is coated with an outer shell material of a latex film with a crimp, a delicate texture is not spoiled. Since even a low viscous cosmetic material such as a liquid foundation is not absorbed into the interior, wasteful consumption of a cosmetic material is greatly reduced.

(b) A cosmetic material can be easily removed only by water washing, and a delicate texture can be removed.

(c) A problem of rot and mold generation can be resolved, and thus the puff is quite sanitary.

(c) Because the crimp pattern plates with a latex film formed thereon as described, are vertically erected in arrangement, the jointing of the latex film with a crimp and the latex foam as the core member on both surfaces of the puff member can be uniformly formed at both surfaces. In addition, unevenness of the thickness of the puff member caused by deformation of the crimp pattern plates, or the like can be prevented. Thus, a puff member of stable quality can be obtained.

(e) In addition, separating property of a puff member from a crimp pattern plate which has been coated with the latex film and vulcanized according to the present invention is superior to that of a conventional puff member manufactured by using a conventional crimp pattern plate of an aluminum single body. Further, according to the present invention, the crimp pattern can be easily processed and the crimp pattern plate can be easily exchanged when damaged.

The above and other objects, features and advantages of the present invention will become more apparent from the following description taken in conjunction with the accompanying drawings.

BRIEF DESCRIPTION OF THE DRAWINGS

FIG. 1 is a front elevational view of a crimp pattern plate;

FIG. 2A is a sectional view taken along the line II—II of FIG. 1:

FIG. 2B is similar to FIG. 2A but showing another embodiment of a crimp pattern plate;

FIG. 2C is similar to FIG. 2A but showing still another embodiment of a crimp pattern plate;

FIG. 4 is a flow chart of a method of the present invention with products manufactured by the method.

DESCRIPTION OF PREFERRED EMBODIMENTS

Figure 3:
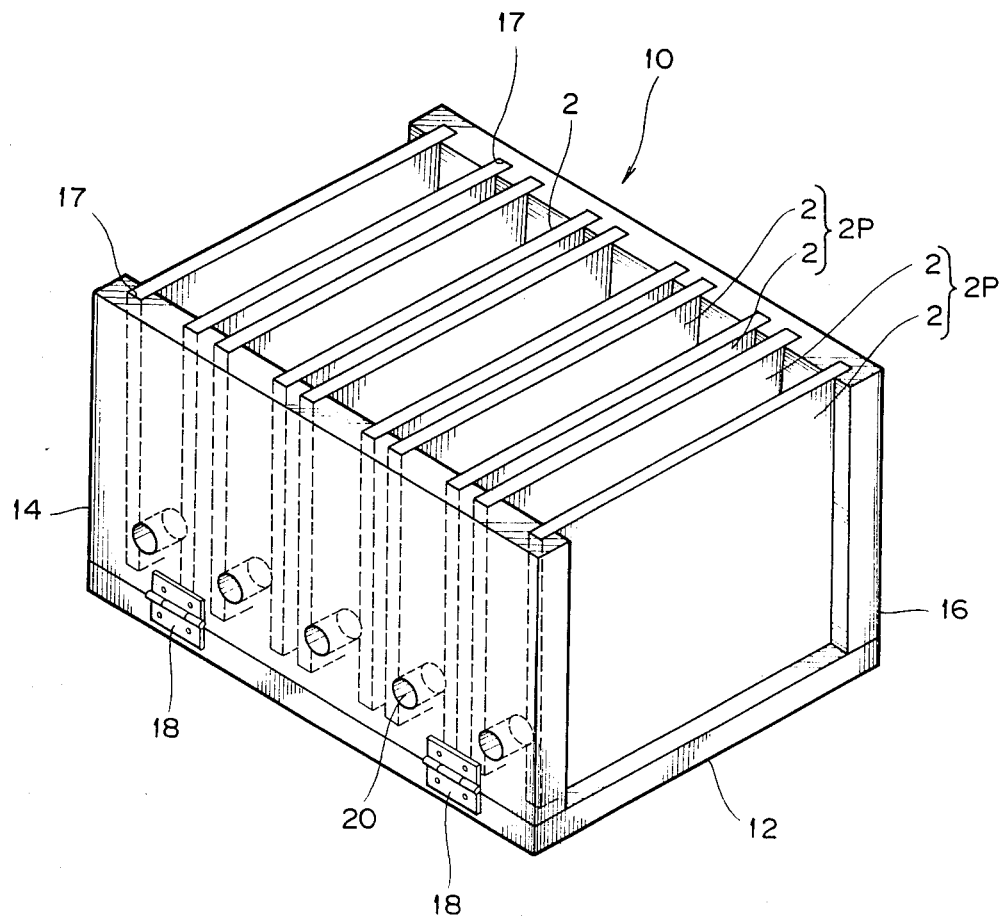
FIG. 3 is a perspective view of a manufacturing framework used in the present invention.

Referring first to FIG. 1 and FIG. 2A showing a first embodiment of a crimp pattern plate adapted to be used in the process of the present invention, reference numeral 2 denotes a crimp pattern plate which comprises a synthetic resin base plate 4 and a plastic layer 6 bonded thereto by an adhesive agent. The plastic layer 6 has a crimp pattern 7 formed thereon. Application of the crimp pattern 7 to the plastic layer 6 and bonding of the synthetic resin base plate 4 and the plastic layer 6 are simultaneously performed by pressing a reversal mold (not shown) on the to of a heap comprising the synthetic resin base plate 4, the plastic layer 6 and the reversal mold stacked up in this order.

The conditions of requirements for a crimp pattern plate 2 will be briefly described. It is required that the crimp pattern plate 2 can be coated with extremely thin latex (10 to 150 $\mu$m) without repelling the latex, and that after vulcanized, a joined body of a latex foam and latex films can be easily separated from the crimp pattern plate 2. Furthermore, it is required that it has a heat resisting property of 140° C. maximum as a using condition of vulcanization, etc., that the crimp pattern 7 can be easily applied, that it is easy to obtain and inexpensive, and that a product does not get much dirty. In view of these conditions of requirements, the plastic layer 6 would preferably be formed of a polyester based plastic, olefin based plastic and the like.

FIG. 2B shows another embodiment of a crimp pattern plate 2' in which the whole surface of the synthetic resin base plate 4 is coated with a platic layer 6'. This embodiment has such an advantage that the separating property of the latex film and the latex foam which are brought to the rear side of the crimp pattern plate 2' would be enhanced.

FIG. 2C shows still another embodiment of a crimp pattern plate 2" in which the crimp pattern 7 may be imprinted directly onto the synthetic resin base plate 4.

Although not specifically illustrated, instead of using the synthetic resin single plate 4 as a base plate, a veneer sheet of a synthetic resin and a metal, or a veneer sheet of a solid rubber and a metal can be used as the base plate of the crimp pattern plate.

FIG. 3 shows a manufacturing framework for a cosmetic puff according to the invention. The manufacturing framework 10 includes a base plate 12, and a pair of side plates 14, 16 pivotally mounted to the base plate 12 by means of hinges 18. Each side plate 14 or 16 has a plurality of vertical grooves 17 formed on the inside surface thereof when viewed in its erected state. A plurality of crimp pattern plates 2 are arranged in a vertically parallel relationship with one another on the bottom plate 12 with both ends of each plate 2 being received in the vertical grooves 17 of the side plates 14, 16. Each pair 2P of the crimp pattern plates 2 are spaced at a distance equal to the thickness of the puff to be manufactured with crimp pattern formed surfaces facing with each other. The side plates 14, 16 have a plurality of inlet ports 20 for the latex foam compound.

FIG. 3 shows an assembled state of the manufacturing framework 10 and each crimp pattern is coated with a thin latex film hereinafter described. Although the crimp pattern plates 2 are shown rectangular in shape, the configuration of the crimp pattern plates are not particularly limited to this embodiment. They may be, for example, trapezoid, semi-dome, elongated semi-dome, or the like. With this construction, although the distinction between the side plate and the bottom plate becomes unclear, the bottom plate may be considered as a part of the side plate or an integral shroud may replace the bottom plate and the side plates.

As the crimp pattern plates 2 and the manufacturing framework 10 adapted to be used in a method of the present invention have been described in detail, the method of manufacturing a cosmetic puff for liquid foundation will be described hereinbelow.

First, a latex foam compound which is an emulsion and a latex film compound which is also an emulsion are separately prepared. The latex foam compound may include, for example, NBR latex, foaming agent, coloring agent, vulcanizing agent, vulcanizing accelerator, foaming stabilizer, thickner and age resister while the latex film compound may include, for example, NBR latex, coloring agent, vulcanizing agent, activator and age resister. Latex film may be produced by spraying the latex film compound onto the crimp patterned surface of the crimp pattern plate 2.

In the next step, the crimp pattern plates 2 each having the latex film coating formed thereon are set in the manufacturing framework 10 as shown in FIG. 3 with each pair 2P of the crimp pattern plates 2 being spaced at a distance equal to the thickness of the puff to be manufactured with crimp pattern surfaces facing with each other. Then, the latex foam compound is foamed by a foaming device and the thus foamed latex foam compound is injected into the manufacturing framework 10 through the inlet ports 20 while adding coagulant and activator therein to thereby produce gelled latex foam.

Then, the manufacturing framework 10 is put into a vulcanizing pan (not shown) and the latex foams and the latex films are vulcanized simultaneously under the conditions of 0.3 kg/cm$^2$ pressure, and 1 100° to 110 C. temperature for about 30 to 40 minutes thereby bonding the latex films firmly onto the latex foam. The manufacturing framework 10 containing vulcanized latex foam coated with latex films is then taken out of the vulcanizing pan and is disassembled to produce a plurality of flat-shaped puff members formed of a latex foam core and latex film coatings. The flat-shaped puff members are then stamped out by a stamping machine to produce a plurality of puffs having a generally oval shape. The puffs are then washed, dehydrated and dried in a dryer at a temperature of about 80° C. for about 120 to 150 minutes.

FIG. 4 is a flow chart showing the above described process of the present invention. The product (B) is obtained by grinding the product (A). In FIG. 4, reference numeral 22 denotes latex foam core and 24 latex films having crimp pattern formed thereon. The product (C) is produced by using a different mold from the one shown in FIG. 3 and bonding two latex films 24 together by heat and press bending with using adhesives.

It is to be noted that since the crimp pattern plate has a plastic layer bonded to a base plate, the base plate can be used repeatedly by bonding a new plastic layer again after peeling off the worn out plastic layer.

While the invention has been described and shown with particular reference to the preferred embodiments, it will be apparent that variations might be possible that would fall within the scope of the present invention which is not intended to be limited except as defined in the following claims.

What is claimed is:

1. A method of manufacturing a cosmetic puff for liquid foundation comprising the steps of:
    preparing a latex compound;
    preparing a latex film compound;
    forming a latex film coating on one side of a crimp pattern plate by applying the latex film compound thereon;
    setting the latex film coating crimp pattern plates in a manufacturing framework;
    foaming the latex compound to form a latex foam compound;
    injecting the foamed latex foam compound into the manufacturing framework through inlet ports while adding coagulant and activator therein to produce a gelled latex foam covered with latex films on both surfaces; and
    vulcanizing the gelled latex foam and the latex films simultaneously to bond the latex films onto the gelled latex foam.

2. The method of manufacturing a cosmetic puff for liquid foundation according to claim 1 further comprising:
    separating the vulcanized latex foam covered with latex films on both sides from the crimp pattern plates by disassembling the manufacturing framework; and
    cutting the latex foam covered with latex films to produce a desired shape of the puff.

3. The method of manufacturing a cosmetic puff for liquid foundation according to claim 1 wherein said crimp pattern plate comprises a base plate and a plastic layer bonded thereon, said plastic layer having a crimp pattern formed thereon.

* * * * *